L. ATWOOD.
FISHING REEL.
APPLICATION FILED JUNE 9, 1920.

1,392,735.

Patented Oct. 4, 1921.

Inventor,
Leonard Atwood;
By A. B. Upham,
Attorney.

UNITED STATES PATENT OFFICE.

LEONARD ATWOOD, OF BOSTON, MASSACHUSETTS.

FISHING-REEL.

1,392,735.  Specification of Letters Patent.  Patented Oct. 4, 1921.

Application filed June 9, 1920. Serial No. 387,772.

*To all whom it may concern:*

Be it known that I, LEONARD ATWOOD, a citizen of the United States, and a resident of Boston, in the county of Suffolk and Commonwealth of Massachusetts, have invented certain new and useful Improvements in Fishing-Reels, of which the following is a full, clear, and exact specification.

This invention relates to that type of fishing reels wherein the spool is provided with a toothed wheel engaged by a detent for controlling the rotation of the spool, and particularly to the one for which a patent was granted to me Nov. 5, 1918, and numbered 1,284,039; and my improvements relate to means for rendering the detent equally resistant to both forward and backward rotation of the spool, to improved means for varying the degree of such resistance, and to certain details of construction hereinafter set forth.

Figure 1:
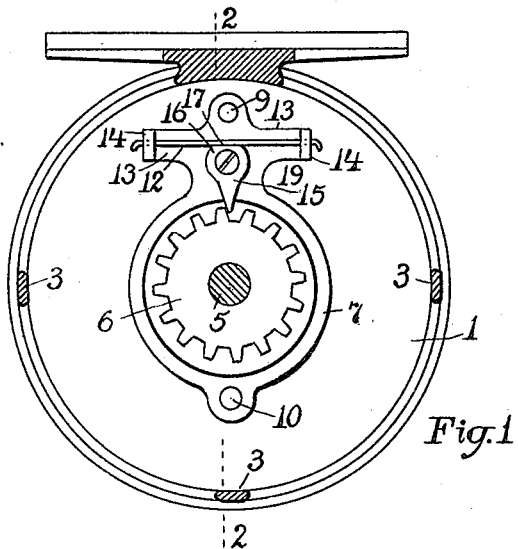
Figure 2:
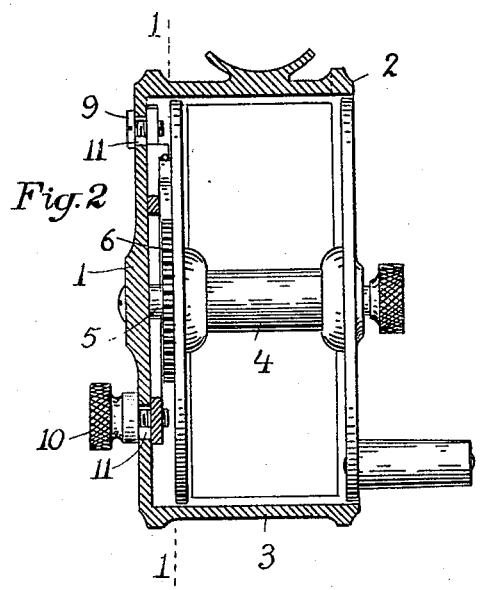

In the drawings forming part of this specification, Figure 1 is section of the reel on the line 1—1 in Fig. 2. Fig. 2 is a section on the line 2—2 in Fig. 1.

The reel consists of a frame comprising a plate 1, an annulus 2 and bars 3 joining the annulus and plate; and a spool 4 revolubly supported on a spindle 5 projecting from the plate 1. Fastened to the spool 4 is a toothed disk 6, and about this toothed disk or pinion 6 is a ring 7 confined to the plate 1 by screws 9 and 10 slidable in slots 11 in this plate. From the upper section of the ring 7 projects a neck 12 having lugs 13 each provided with an ear 14.

The detent 15 is pivoted at 16 to the neck 12 and is formed with a flattened portion 17 diametrically opposite the point of the detent, and pressing against this flattened portion is a length of spring wire 19 having its ends passing through the ears 14 and kept therein by bending the ends of the wire slightly.

By unloosening the thumb screw 10, the ring 7 together with the detent 15 can be slid up or down to remove the detent entirely from engagement with the pinion 6, or to vary the degree of its engagement therewith, for the deeper the detent enters between the teeth of the pinion, the greater the angle to which the detent must be swung to permit it to pass a tooth and enter the space between this tooth and its neighbor, and the greater the resistance to rotation.

If it is not desired to produce an adjustable detent, the ring 7 can be dispensed with and the neck 12 and lugs 13 can be fastened to the plate 1 in any suitable manner at a proper fixed position to accommodate the detent.

It should be noted that the flattened portion 17 of the detent composes the chord of a circle concentric with the pivot 16, and also that this flattened portion is opposed by the middle of the wire 19. Hence the resistance given by the wire to the detent's turning is exactly equal in both directions of the detent's movements, so that the rotation of the spool 4 is equally resisted by the detent whether it is being unwound or wound up. By releasing the pinion 6 entirely from the detent, the spool will revolve freely to permit the hook and line to be cast to a considerable distance.

What I claim is:

1. A fishing reel having a spool provided with a pinion, a pivotally supported detent engaging said pinion, the detent having a flattened portion, and a length of spring supported at its ends and pressing at its midlength against said flattened portion, whereby the resistance to oscillation given to the detent is equal in both directions.

2. A fishing reel having a spool provided with a pinion, a pivotally supported detent engaging said pinion, the detent having a flattened portion composing the chord of a circle of which the pivot is the center, ears supported equidistant from said detent, each ear having a hole through it, and a length of spring wire passing through said holes and having its ends bent laterally to confine it therein, the middle of the wire pressing against said flattened portion of the detent.

3. A fishing reel comprising a frame plate, arms adjustably supported by said plate, a spool revolubly supported by said plate, a pinion carried by said spool, a detent pivotally supported by said arms, and having a flattened portion, and a length of spring wire supported at its ends by said arms and pressing at its midlength against said flattened portion of the detent.

4. A fishing reel comprising a frame plate, a spindle supported thereby, a spool revoluble on said spindle, a pinion turning with said spool, a ring adjustably attached to said plate and having a neck and arms projecting therefrom, a detent pivoted to said neck and having a flattened portion, and a length of spring wire carried by said arms and engaging said flattened portion.

5. A fishing reel comprising a frame plate, a spindle supported thereby, a spool revoluble on said spindle, a pinion turning with said spool, a ring loosely inclosing said pinion, a thumb screw loosely carried by said plate and engaging said ring, and a length of spring wire carried at its ends by said ring, and a detent controlled by said wire.

In testimony that I claim the foregoing invention, I have hereunto set my hand this 8th day of June, 1920.

LEONARD ATWOOD.